US011728703B2

(12) United States Patent
Grabherr et al.

(10) Patent No.: US 11,728,703 B2
(45) Date of Patent: Aug. 15, 2023

(54) ELECTRIC MACHINE FOR A VEHICLE (71) Applicant: Mahle International GmbH, Stuttgart (DE)

(72) Inventors: Philip Grabherr, Stuttgart (DE); Mirko Hoerz, Esslingen (DE); Andrej Licen, Branik (SI); Stojan Markic, Kojsko (SI); Aleks Medvescek, Rence (SI); Peter Sever, Murska Sobota (SI); Josef Sonntag, Nuertingen (DE); Hans-Ulrich Steurer, Stuttgart (DE)

(73) Assignee: Mahle International GmbH, Stuttgart (DE)

( * ) Notice: Subject to any disclaimer, the term of this patent is extended or adjusted under 35 U.S.C. 154(b) by 214 days.

(21) Appl. No.: 16/892,255

(22) Filed: Jun. 3, 2020

(65) Prior Publication Data
US 2020/0295616 A1  Sep. 17, 2020

Related U.S. Application Data

(63) Continuation of application No. PCT/EP2018/081524, filed on Nov. 16, 2018.

(30) Foreign Application Priority Data

Dec. 4, 2017  (DE) ............... 10 2017 221 805.3

(51) Int. Cl.
*H02K 3/24* (2006.01)
*H02K 5/15* (2006.01)
(Continued)

(52) U.S. Cl.
CPC ............. *H02K 3/24* (2013.01); *H02K 5/15* (2013.01); *B60K 1/00* (2013.01); *H02K 9/227* (2021.01)

(58) Field of Classification Search
CPC ............ H02K 5/15; H02K 9/197; H02K 3/24; H02K 5/08; H02K 9/227; B60K 1/00
(Continued)

(56) References Cited

U.S. PATENT DOCUMENTS

| 2,702,870 A | * | 2/1955 | Norris ..................... H02K 3/24 |
| | | | 310/262 |
| 2,917,644 A | * | 12/1959 | Laffoon ................. H02K 9/00 |
| | | | 310/55 |

(Continued)

FOREIGN PATENT DOCUMENTS

| CN | 1327627 A | 12/2001 |
| CN | 1515060 A | 7/2004 |

(Continued)

OTHER PUBLICATIONS

Translation of foreign document JP 10271738 A (Year: 1998).*
(Continued)

*Primary Examiner* — Alex W Mok
(74) *Attorney, Agent, or Firm* — Ewers IP Law PLLC; Falk Ewers (57) ABSTRACT

An electric machine includes a rotor, rotatable about an axis of rotation defining an axial direction, and a stator having stator windings, a coolant distribution chamber and a coolant collection chamber arranged axially at a distance thereto. The coolant distribution chamber fluidically communicates with the coolant collection chamber with a cooling channel through which a coolant can flow. The cooling channel and the stator winding are embedded in a plastic mass made of a plastic for thermal coupling to the coolant. The stator has stator teeth extending along the axial direction and spaced apart from one another along a circumferential direction and carrying the stator windings. The plastic mass is arranged together with the cooling channel and the stator winding in an intermediate space formed between two stator teeth (Continued)

arranged adjacent in the circumferential direction and sections of cooling channel are configured as a tube body within the intermediate space.

27 Claims, 5 Drawing Sheets

(51) Int. Cl.
  *B60K 1/00* (2006.01)
  *H02K 9/22* (2006.01)
(58) Field of Classification Search
  USPC .......................................................... 310/65
  See application file for complete search history.

(56) References Cited

U.S. PATENT DOCUMENTS

| | | | | |
|---|---|---|---|---|
| 5,189,325 | A | * | 2/1993 | Jarczynski ............... H02K 9/19 |
| | | | | 310/61 |
| 5,214,325 | A | | 5/1993 | Matson et al. |
| 5,973,427 | A | | 10/1999 | Suzuki et al. |
| 6,388,348 | B2 | * | 5/2002 | van Heyden ........... B60K 6/405 |
| | | | | 310/78 |
| 6,787,948 | B2 | * | 9/2004 | Peterson ................. H02K 3/24 |
| | | | | 310/58 |
| 6,789,305 | B2 | | 9/2004 | Seki et al. |
| 6,856,053 | B2 | * | 2/2005 | LeFlem .................. H02K 9/197 |
| | | | | 310/194 |
| 7,538,457 | B2 | * | 5/2009 | Holmes .................... H02K 3/24 |
| | | | | 310/57 |
| 7,589,441 | B2 | * | 9/2009 | Kalsi ........................ H02K 3/47 |
| | | | | 310/180 |
| 7,705,495 | B2 | | 4/2010 | Alfermann et al. |
| 8,207,642 | B2 | * | 6/2012 | Lafontaine ........... H02K 11/048 |
| | | | | 310/90 |
| 8,400,029 | B2 | * | 3/2013 | Sugimoto ................ H02K 1/20 |
| | | | | 310/58 |
| 8,541,923 | B2 | | 9/2013 | Leiber et al. |
| 8,766,497 | B2 | * | 7/2014 | Goto ...................... H02K 7/006 |
| | | | | 310/71 |
| 2004/0014525 | A1 | | 7/2004 | Arimitsu et al. |
| 2008/0042498 | A1 | | 2/2008 | Beer |
| 2013/0069455 | A1 | * | 3/2013 | Hamer ..................... H02K 5/20 |
| | | | | 264/266 |
| 2014/0091651 | A1 | * | 4/2014 | Dorfstatter ............... H02K 9/00 |
| | | | | 310/58 |
| 2015/0381010 | A1 | * | 12/2015 | Kobes ..................... H02K 5/20 |
| | | | | 29/598 |

FOREIGN PATENT DOCUMENTS

| | | | |
|---|---|---|---|
| CN | 101183805 A | | 5/2008 |
| CN | 102428629 A | | 4/2012 |
| CN | 203352307 U | * | 12/2013 |
| DE | 19813160 C2 | | 2/2001 |
| DE | 102006029803 A1 | | 1/2008 |
| DE | 102007054364 A1 | | 5/2008 |
| EP | 1593191 A1 | | 11/2005 |
| JP | 10271738 A | | 10/1998 |
| JP | 2003070199 A | | 3/2003 |
| JP | 2003299289 A | * | 10/2003 |
| WO | 2004073144 A1 | | 8/2004 |
| WO | WO-2013054479 A1 | * | 4/2013 ............. H02K 3/522 |

OTHER PUBLICATIONS

Search Report dated Oct. 28, 2021 issued in Chinese counterpart application No. 201880078005.2 and English language translation thereof.

Office Action dated Nov. 3, 2021 issued in Chinese counterpart application No. 201880078005.2 and English-language translation thereof.

Written Opinion of the International Searching Authority of the European Patent Office in PCT/EP2018/081524 (from which this application claims priority) dated Jan. 31, 2019 and English-language translation thereof.

International Search Report of the European Patent Office in PCT/EP2018/081524 (from which this application claims priority) dated Jan. 31, 2019 and English-language translation thereof.

* cited by examiner

ELECTRIC MACHINE FOR A VEHICLE

CROSS REFERENCE TO RELATED APPLICATIONS

This application is a continuation application of international patent application PCT/EP2018/081524, filed Nov. 16, 2018 designating the United States and claiming priority to German application DE 10 2017 221 805.3, filed Dec. 4, 2017, and the entire content of both applications is incorporated herein by reference.

TECHNICAL FIELD

The disclosure relates to an electric machine, in particular for a vehicle, as well as a vehicle including a machine of this type.

BACKGROUND

An electric machine of this type can generally be an electric motor or a generator. The electric machine can be formed as external rotor or as internal rotor.

A generic machine is known, for example from U.S. Pat. No. 5,214,325. It includes a housing, which surrounds an interior and which has a jacket, which revolves in a circumferential direction of the housing and radially limits the interior, a rear side wall, which axially limits the interior axially on one side, and a front side wall, which axially limits the interior axially on the other side. A stator of the machine is firmly connected to the jacket. A rotor of the machine is arranged in the stator, wherein a rotor shaft of the rotor is rotatably supported via a front shaft bearing on the front side wall.

The stator of a conventional electric machine typically includes stator windings, which are electrically energized during operation of the machine. Heat is thereby created, which has to be dissipated in order to avoid an overheating and damages to or even destruction of the stator associated therewith. For this purpose, it is known from conventional electric machines to equip the latter with a cooling device for cooling the stator—in particular said stator windings. A cooling device of this type includes one or several cooling channels, through which a coolant flows and which are arranged in the stator in the vicinity of the stator windings. Heat can be dissipated from the stator by heat transfer from the stator windings to the coolant.

It turns out to be disadvantageous thereby that an efficient heat transfer from the stator to the coolant, which flows through the respective cooling channel, is associated with significant structural effort. However, this has a disadvantageous impact on the production costs of the electric machine.

SUMMARY

It is thus an object of the present disclosure to provide an improved electric machine, in the case of which this disadvantage is largely or even completely eliminated. An improved electric machine includes an improved cooling of the stator windings of the stator.

This object is achieved by an electric machine, in particular for a vehicle, and a vehicle, in particular a motor vehicle, including at least one electric machine.

It is a general idea of the disclosure to embed the stator windings of an electric machine, together with a cooling channel through which coolant can flow, in a plastic mass made of a plastic, to cool the stator windings. The plastic can thus act as heat-transferring medium to transfer heat from the stator windings to the coolant. A particularly good heat transfer between the stator windings and the coolant, which is guided through the cooling channel, is established in this way. This applies in particular, when a plastic is used, which has a high thermal conductivity. In particular so-called thermoplastic and thermosetting plastics are suitable for this purpose. Due to the fact that a plastic typically also has the properties of an electric insulator, it is simultaneously ensured that the stator windings, which are to be cooled, are not electrically short-circuited by the plastic in an unwanted manner. The direct thermal coupling of the cooling channel including the coolant to the stator windings, which are to be cooled, with the help of the embedding of these two components in a plastic mass made of plastic, leads to a cooling of the stator windings, which is particularly effective as compared to conventional cooling devices. In the case of a high waste heat development in the stator, as it occurs, for example, during a high load operation of the electric machine, it can thus also be ensured that the generated waste heat can be dissipated from the stator. Damages to or even destruction of the electric machine by overheating of the stator can thus be avoided.

According to an aspect of the disclosure, the cooling channel is formed as a tube body including two broad sides and two narrow sides, wherein the two broad sides are located opposite one another in the circumferential wall. By using a tube body, the cooling channel can be provided in the intermediate space in a simple manner. By arranging the two broad sides so as to be located opposite one another along the circumferential direction—the two broad sides thus extend along the radial direction—the installation space available in the intermediate space for the cooling channel is utilized particularly effectively.

The production of the plastic mass can take place with injection molding, in the case of which the stator windings, which are to be cooled, as well as the cooling channel, are extrusion-coated with the plastic to form the plastic mass. The embedding of the stator windings and of the cooling channel in the plastic mass is thus very simple. Significant cost advantages result from this in the production of the electric machine according to an aspect of the disclosure.

An electric machine according to an aspect of the disclosure, in particular for a vehicle, includes a rotor, which can be rotated about an axis of rotation. The axis of rotation defines an axial direction of the electric machine. The machine further includes a stator, which has several stator windings. The machine further includes a coolant distribution chamber and a coolant collector, which is arranged axially at a distance thereto. The coolant distribution chamber thereby communicates fluidically with the coolant collector with at least one cooling channel, through which a coolant can flow. Several cooling channels of this type are typically provided between the coolant distribution chamber and the coolant collection chamber. According to an aspect of the disclosure, the at least one cooling channel and the at least one stator winding are embedded at least section by section in at least one plastic mass made of a plastic for thermal coupling to the coolant.

According to an aspect of the disclosure, the stator has stator teeth, which extend along the axial direction and which are arranged spaced apart from one another along a circumferential direction and which carry the stator windings. The at least one plastic mass is thereby arranged together with the at least one cooling channel and with the at least one stator winding in an intermediate space, which is formed between two stator teeth, which are adjacent in the circumferential direction. Within the intermediate space, the at least one cooling channel is formed as a tube body, which has two broad sides in a cross-section perpendicular to the axial direction, wherein the two broad sides are located opposite one another in the circumferential direction. This means that the cooling channel extends along the radial direction.

According to an advantageous further development, the at least one stator in the intermediate space is embedded in the first plastic mass made of the first plastic material, thus arranged therein. In the case of this further development, the first plastic mass together with the stator winding embedded or arranged therein, respectively, and the at least one cooling channel are arranged in the second plastic mass made of the second plastic material and/or are limited by it. The thermal conductivity of the second plastic material is typically smaller than the thermal conductivity of the first plastic material. The use of two plastic materials including different thermal conductivity allows for the provision of a relatively expensive plastic material comprising a high thermal conductivity only for the particularly important thermal transfer from the plastic mass to the cooling channel. In contrast, the individual windings of the stator winding can be injection molded into a plastic material including a lower thermal conductivity. As a result, this leads to cost advantages in the production, because a relatively cost-efficient plastic material can be used for embedding the stator windings in the plastic mass.

The tube body typically has two narrow sides, which are located opposite one another in the radial direction. The two narrow sides advantageously connect the two broad sides of the tube body to one another in the cross-section perpendicular to the axial direction. This variation requires particularly little installation space.

According to an advantageous further development, the radially outer narrow side of the tube body touches the second plastic mass or protrudes into the latter in the cross-section perpendicular to the axial direction. This facilitates the assembly of the tube body in the intermediate space.

According to a further exemplary embodiment, the radially inner narrow side as well as the two broad sides of the tube body are covered or coated with the second plastic mass in the cross section perpendicular to the axial direction.

According to another exemplary embodiment, the tube body has the geometry of a rectangle or of a trapezoid in the cross-section perpendicular to the axial direction. In the alternative or in addition, the tube body can taper radially to the inside in the cross-section perpendicular to the axial direction. The installation space available for receiving the tube body space can be used particularly effectively in this way.

According to an advantageous further development, the radially outer one of the two narrow sides has a larger lateral length than the radially inner narrow side in the cross-section perpendicular to the axial direction.

Particularly typically, the lateral length of at least one of the two narrow sides is maximally one fourth, typically maximally one fifth, of a lateral length of at least one of the broad sides in the cross-section perpendicular to the axial direction, such that the tube body forms a flat tube. With regard to installation space, a flat tube of this type can be arranged in the intermediate space between the two stator teeth in a particularly advantageous manner.

According to another advantageous further development, the tube body divides the intermediate space, which is limited by a first and a second stator tooth in the circumferential direction, into a first and a second partial space along the circumferential direction. In the case of this further development, a first stator winding, which is wound onto the first stator tooth, is arranged in the first partial space. A second stator winding, which is wound onto the second stator tooth, is arranged in the second partial space. This measure allows for an effective thermal coupling of the coolant, which flows through the cooling channel, to the first as well as the second stator winding.

In the case of a further exemplary embodiment, the tube body surrounds a tube body interior. In the case of this exemplary embodiment, at least one separating element, which divides the tube body interior into at least two partial cooling channels, which are fluidically separated from one another, is provided or integrally molded on the tube body. The tube body can be realized as multi-chamber tube in this way.

According to an exemplary embodiment, the coolant distribution chamber and/or the coolant collection chamber is at least partially arranged in the at least one plastic mass and is limited by the latter for thermal coupling to the at least one stator winding. This provides for a particularly good heat transfer between the coolant distribution chamber or coolant collection chamber, respectively, and the stator windings, such that the coolant distribution chamber or the coolant collection chamber, respectively, can also be used for the direct absorption of heat from the stator windings.

According to a further exemplary embodiment, the coolant distribution chamber and/or the coolant collection chamber are formed by a cavity, which is present at least partially, typically completely, in the plastic mass. The provision of a separate casing or of a housing, respectively, for limiting the coolant distribution chamber or coolant collection chamber, respectively, can thus be forgone. This is associated with significant cost advantages.

A further advantageous design thus provides that the plastic mass at least partially limits the coolant distribution chamber and/or the coolant collection chamber. The provision of a separate limitation, for instance in the form of a housing, can thus be forgone.

The first plastic mass advantageously protrudes axially, typically on both sides, from at least one intermediate space. The plastic mass can thus also be used for partially limiting the coolant distributor or the coolant collector, respectively. A removal, which is required as part of the production of the machine, of the part of the plastic mass, which protrudes from the intermediate space, can in particular be forgone which is associated with cost advantages in the production of the machine.

The coolant distribution chamber and/or the coolant collection chamber can advantageously have a ring-shaped geometric shape in a cross-section perpendicular to the axis of rotation of the rotor. This allows for the arrangement of a plurality of cooling channels spaced apart from one another along the circumferential direction of the stator.

According to another exemplary embodiment, the coolant distribution chamber and/or the coolant collection chamber is arranged radially on the outside and/or radially on the inside of the first or second end portion, respectively, of the at least one stator winding. Due to the fact that the coolant distribution chamber or coolant collection chamber, respectively, is thus arranged directly adjacent to the stator windings, which are to be cooled, with respect to the radial direction, an effective thermal coupling of the coolant distribution chamber or coolant collection chamber, respectively, to the stator windings, which are to be cooled, is attained in this way.

According to a further exemplary embodiment, the coolant distribution chamber and/or the coolant collection chamber form an axial extension of the stator winding or are in each case arranged in an axial extension of the stator winding.

Particularly typically, the coolant distribution chamber and/or the coolant collection chamber are connected axially to the at least one stator winding. Due to the fact that the coolant distribution chamber or coolant collection chamber, respectively, is thus arranged directly adjacent to the stator windings, which are to be cooled, with respect to the axial direction, an effective thermal coupling of the coolant distribution chamber or coolant collection chamber, respectively, to the stator windings, which are to be cooled, is attained in this way.

According to a further exemplary embodiment, the coolant distribution chamber and/or the coolant collection chamber connect to the at least one stator winding, typically to the first or second axial end portion thereof, respectively, radially on the outside and/or radially on the inside as well as axially on the end side. The coolant distribution chamber or the coolant collection chamber, respectively, can thus also be used to cool the axial end portions of the stator windings.

The coolant distribution chamber and/or the coolant collection chamber particularly typically surrounds the first or second axial end portion, respectively, of the at least one stator winding in a U-shaped manner in a longitudinal section along the axis of rotation of the rotor. A particularly good thermal coupling of the coolant, which is present in the coolant distribution chamber or coolant collection chamber, respectively, to the stator windings, which are to be cooled, is effected in this way.

According to another exemplary embodiment, the stator is arranged along the axial direction between a first and a second bearing shield, which are located opposite one another along the axial direction. In this exemplary embodiment, a part of the coolant distribution chamber is arranged in the first bearing shield. In the alternative or in addition, a part of the coolant collection chamber is arranged in the second bearing shield.

According to another exemplary embodiment, a coolant supply, which fluidically connects the coolant distribution chamber to a coolant inlet, which is provided on the first bearing shield on the outside, typically on the front side or on the circumferential side, is formed in the first bearing shield. A coolant discharge, which fluidically connects the coolant collection chamber to a coolant outlet, which is provided on the second bearing shield on the outside, typically on the front side or on the circumferential side, is further formed in the second bearing shield. The coolant supply can particularly typically be thermally connected to a first shaft bearing, which is provided in the first bearing shield, for rotatably supporting the stator. The coolant discharge can analogously be thermally connected to a second shaft bearing, which is provided in the second bearing shield, for rotatably supporting the stator.

According to an exemplary embodiment, which can be produced with little manufacturing effort, a plastic mass, which consists of a single plastic material, is provided in the intermediate space. In this exemplary embodiment, an electrical insulation made of an electrically insulating material is arranged in the intermediate space between the plastic mass and the stator. Due to the fact that in the case of this exemplary embodiment only a single plastic material has to be introduced into the intermediate spaces, the production of the plastic mass made of this plastic can take place in a single injection molding step. The production of the plastic mass is thus particularly simple, which is associated with cost advantages.

Together, the plastic mass, typically the first and the second plastic mass, advantageously completely fills or fill the intermediate space, respectively. The formation of unwanted intermediate spaces, for instance in the manner of air gaps, which would lead to an unwanted reduction of the heat transfer, is prevented in this way.

The plastic material, in particular the first and/or second plastic material, of the first and/or of the second plastic mass advantageously includes a thermosetting plastic or is a thermosetting plastic of this type. Thermosetting plastics of this type can be obtained commercially at low prices, so that they are very well suited for use as plastic material of the plastic masses of the electric machine introduced here.

An advantageous further development provides that the first plastic material of the first plastic mass and/or the second plastic material of the second plastic mass includes a thermoplastic or is a thermoplastic. The thermal conductivity of thermosetting plastics as well as of thermoplastics can be set by the selection of the material composition. The thermal conductivity of a thermoplastic can thus be equal to or greater than the thermal conductivity of a thermosetting plastic and vice versa. A use of thermoplastics has various advantages as compared to the use of thermosetting plastics. For example, thermoplastics can be recycled better as a result of the reversible shaping process used in response to the processing thereof or have a lower brittleness and improved dampening properties as compared to thermosetting plastics, respectively.

According to an advantageous further development, the first plastic material of the first plastic mass is a thermoplastic or a thermosetting plastic, whereas the second plastic material of the second plastic mass is a thermosetting plastic. Due to the fact that the acquisition of thermosetting plastics is more cost-efficient than thermoplastics, it is advisable to use thermoplastics selectively for cost reasons.

At least one cooling channel can advantageously in each case be provided in each intermediate space between two stator teeth, which are in each case adjacent in the circumferential direction. It is ensured in this way that waste heat, which is operatively generated, can be dissipated from all available stator windings.

The disclosure further relates to a vehicle, in particular a motor vehicle, including at least one above-introduced electric machine. The above-described advantages of the electric machine can thus also be transferred to the vehicle according to an aspect of the disclosure.

Further important features and advantages of the disclosure follow from the claims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
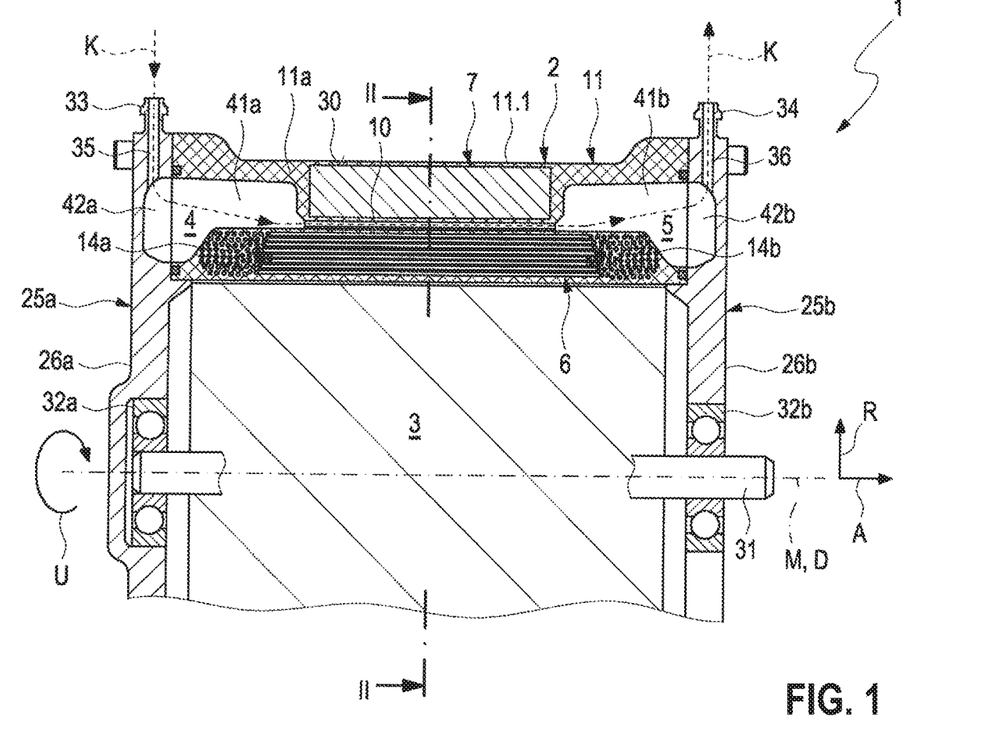
FIG. 1 shows an electric machine in a longitudinal section along the axis of rotation of the rotor according to an exemplary embodiment of the disclosure.

FIG. 1 illustrates an electric machine 1 according to an exemplary embodiment of the disclosure in a sectional illustration. The electric machine 1 is dimensioned such that it can be used in a vehicle, typically in a road vehicle.

Figure 2:
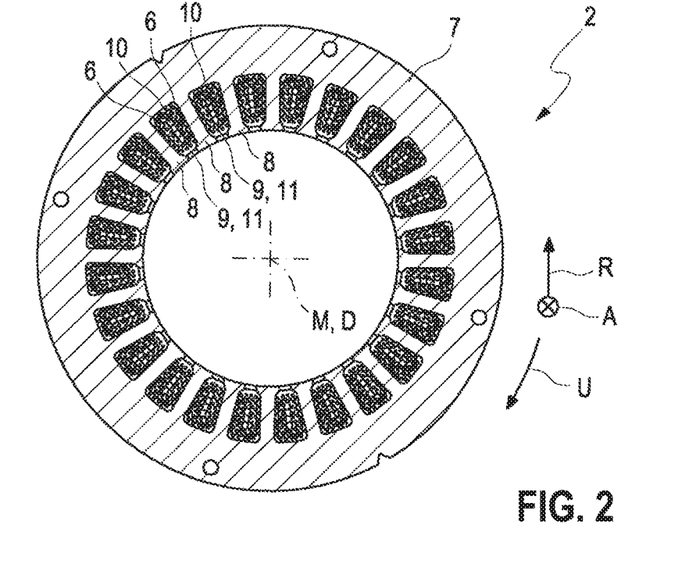
FIG. 2 shows the stator of the electric machine shown in FIG. 1 in a cross-section perpendicular to the axis of rotation of the rotor.

The electric machine 1 includes a rotor 3, which is only illustrated roughly schematically in FIG. 1, and a stator 2. For reasons of clarity, the stator 2 is illustrated in FIG. 2 in a cross-section perpendicular to the axis of rotation D along the sectional line II-II of FIG. 1 in a separate illustration. According to FIG. 1, the rotor 3 has a rotor shaft 31 and can have several magnets, which are not illustrated in more detail in FIG. 1 and the magnetic polarization of which alternates along the circumferential direction U. The rotor 3 can be rotated about an axis of rotation D, the position of which is defined by the central longitudinal axis M of the rotor shaft 31. An axial direction A, which extends parallel to the axis of rotation D, is defined by the axis of rotation D. A radial direction R is perpendicular to the axial direction A. A circumferential direction U rotates around the axis of rotation D.

As can be seen in FIG. 1, the rotor 3 is arranged in the stator 2. The electric machine 1 shown here is thus a so-called internal rotor. A realization as so-called external rotor, in the case of which the rotor 3 is arranged outside of the stator 2, is also conceivable. The rotor shaft 31 is supported on the stator 2 in a first shaft bearing 32a and, axially spaced apart therefrom, in a second shaft bearing 32b, so as to be rotatable around the axis of rotation D.

In a known manner, the stator 2 furthermore includes several stator windings 6, which can be electrically energized, to generate a magnetic field. Due to magnetic interaction of the magnetic field, which is generated by the magnets of the rotor 3, the rotor 3 is set in rotation with the magnetic field generated by the stator windings 6.

It can be gathered from the cross-section of FIG. 2 that the stator 2 can have a ring-shaped stator body 7, for example made of iron. The stator body 7 can in particular be formed of several stator body plates (not shown), which are stacked on top of one another along the axial direction A and which are adhered to one another. Several stator teeth 8, which extend along the axial direction A, protrude radially to the inside away from the stator body 7, and are arranged spaced apart from one another along the circumferential direction U, are integrally molded to the stator body 7 radially on the inside. Each stator tooth 8 carries a stator winding 6. Together, the individual stator windings 6 form a winding arrangement. Depending on the number of the magnetic poles, which are to be formed by the stator windings 6, the individual stator windings 6 of the entire winding arrangement can be wired together electrically in a suitable manner.

During operation of the machine 1, the electrically energized stator windings 6 generate waste heat, which has to be dissipated from the machine 1, in order to prevent an overheating and damages to or even destruction of the machine 1 associated therewith. The stator windings 6 are thus cooled with the help of a coolant K, which is guided through the stator 2, and which absorbs the waste heat generated by the stator windings 6 with heat transfer.

To guide the coolant K through the stator 2, the machine 1 includes a coolant distribution chamber 4, into which a coolant K can be introduced via a coolant inlet 33. A coolant collection chamber 5 is arranged along the axial direction A at a distance from the coolant distribution chamber 4. The coolant distribution chamber 4 communicates fluidically with the coolant collection chamber 5 with several cooling channels 10, of which only a single one can be seen in the illustration of FIG. 1. The coolant distribution chamber 4 and the coolant collection chamber 5 can each have a ring-shaped geometry in a cross-section perpendicular to the axial direction A, which is not shown in the figures. Several cooling channels 10, which each extend along the axial direction A from the ring-shaped coolant distribution chamber 4 to the ring-shaped coolant collection chamber 5, are arranged along the circumferential direction U at a distance from one another. The coolant K, which is introduced into the coolant distribution chamber 4 via the coolant inlet 33, can thus be distributed to the individual cooling channels 10. After flowing through the cooling channels 10 and the absorption of heat from the stator windings, the coolant K is collected in the coolant collection chamber 5 and is dissipated from the machine 1 again via a coolant outlet 34 provided on the stator 2.

As can be seen in the illustrations of FIGS. 1 and 2, the stator windings 6 are arranged in intermediate spaces 9, which are formed between two stator teeth 8, which are each adjacent in the circumferential direction U. Said intermediate spaces 9 are also known to the person of ordinary skill in the art as so-called "stator grooves" or "stator slots", which extend along the axial direction A, as do the stator teeth 8.

Figure 3A:
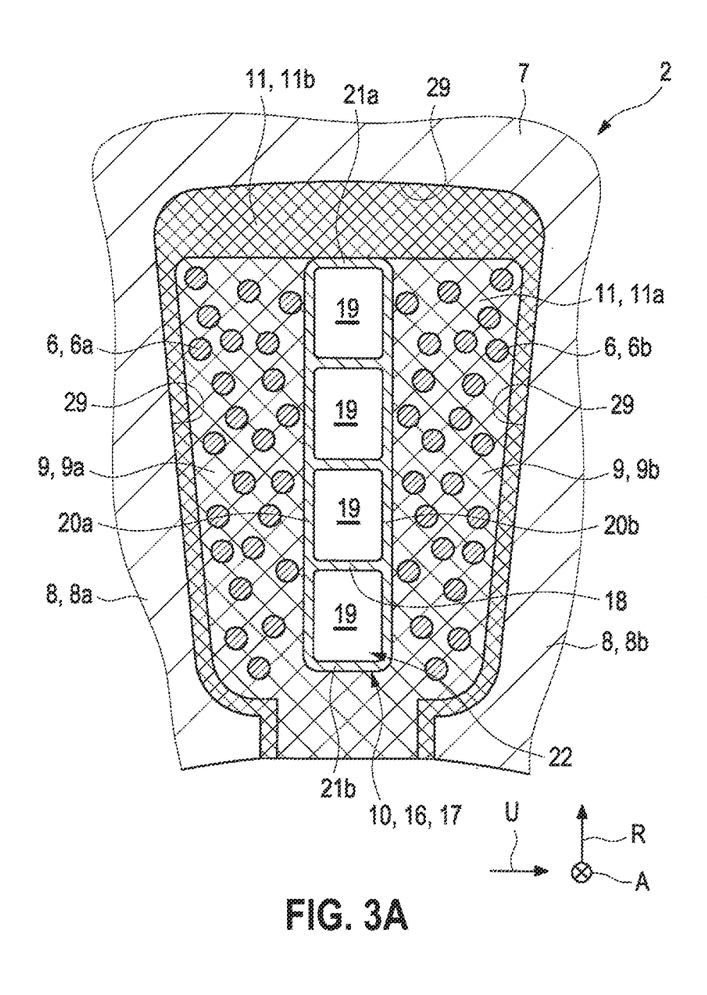
FIG. 3A shows a detailed illustration of the stator of FIG. 2 in the area of an intermediate space between two stator teeth, which are adjacent in the circumferential direction.

FIG. 3A shows an intermediate space 9 formed between two stator teeth 8—hereinafter also referred to as stator teeth 8a and 8b—which are adjacent in the circumferential direction U, in a detailed illustration and in a cross-section perpendicular to the axial direction A. To improve the heat transfer of the waste heat generated by the stator windings 6 to the coolant K flowing through the cooling channels 10, a plastic mass 11 made of a plastic is in each case provided according to FIG. 3A in the intermediate spaces 9. The plastic mass 11 is particularly typically an injection molding mass made of an electrically insulating plastic. The electrically insulating plastic 11 can be a thermoplastic or a thermosetting plastic. The first plastic material of the first plastic mass 11a is typically a thermoplastic or a thermosetting plastic, whereas the second plastic material of the second plastic mass 11b is a thermosetting plastic.

The plastic mass 11 arranged in the intermediate space 9 consists of a first plastic mass 11a made of a first plastic material and of a second plastic mass 11b made of a second plastic material, wherein the two plastic masses 11a and 11b have different thermal conductivities. In the example scenario, the thermal conductivity of the second plastic material, thus of the second plastic mass 11b, is smaller than the thermal conductivity of the first plastic material, thus of the first plastic mass 11a.

As shown in FIG. 3A, the stator winding 6 is embedded in the intermediate space 9 in the first plastic mass 11a made of the first plastic material. The first plastic mass 11a together with the stator winding 6 embedded therein and the cooling channel 10 are embedded in the second plastic mass 11b made of the second plastic material or are arranged therein, respectively, and limited thereby. The surface portions 29 of the two stator teeth 8a and 8b, which limit the intermediate space 9, as well as of the stator body 7, are in particular coated with the second plastic mass 11b. It is prevented in this way that the typically electrically conductive stator teeth 8 can come into electrical contact with the stator windings 6.

As can be seen in FIG. 3A, the channel portion of the cooling channel 10 are arranged in the intermediate space 9 is formed as tube body 16. In the cross-section perpendicular to the axial direction A shown in FIG. 3A, the cooling channel 10 extends in the radial direction R and has two broad sides 20a and 20b, which are located opposite one another in the circumferential direction U. The tube body 16 further has two narrow sides 21 and 21b, which connect the two broad sides 20a and 20b to one another. The two narrow sides 21a and 21b are located opposite one another in the radial direction R, so that a narrow side 21a is arranged radially on the outside and the other narrow side 21b is arranged radially on the inside in the intermediate space 9. The lateral length of at least one of the two narrow sides 21a and 21b is advantageously maximally one fifth of a lateral length of at least one of the two broad sides 20a and 20b, such that the tube body 16 forms a flat tube 17.

The tube body 16 typically divides the intermediate space 9, which is limited by the first and second stator tooth 8a and 8b in the circumferential direction U, into a first and a second partial space 9a and 9b along the circumferential direction U. As shown in FIG. 3A, a first stator winding 6a, which is wound onto the first stator tooth 8a, is arranged in the first partial space 9a. A second stator winding 6b, which is wound onto the second stator tooth 8b, is arranged in the second partial space 9b. In the exemplary embodiment shown in FIG. 3A, the radially outer narrow side 21a of the tube body 16 touches the second plastic mass 11b. In a simplified variation of the example, the use of two different plastic masses can be forgone, i.e., only a single plastic mass is then provided in the intermediate space 9.

The tube body 16 can be made of an electrically conductive material, typically of a metal, such as, for example, aluminum. In the alternative, the tube body 16 can be made of an electrically insulating material, typically of a plastic.

The tube body 16 or the flat tube 17, respectively, surrounds a tube body interior 22, wherein separating elements 18, which divide the tube body interior 22 into several partial cooling channels 19, are integrally molded on the tube body 16. Three separating elements 18 are shown in an exemplary manner in FIG. 3A, such that four partial cooling channels 19 result. The tube body can generally be realized as multi-chamber tube including any number of partial cooling channels 19.

Figure 3B:
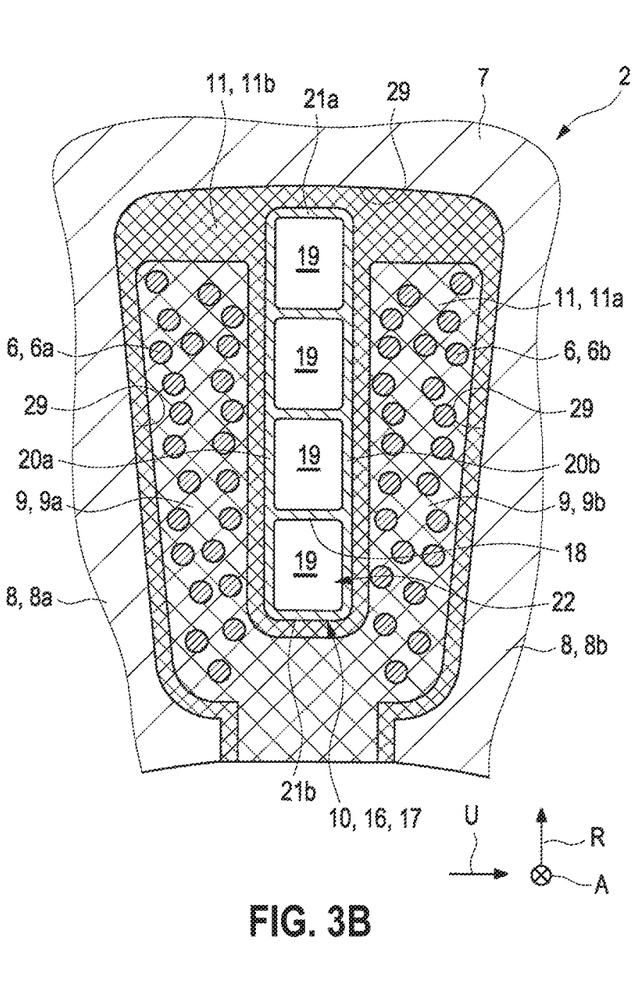
FIGS. 3B to 3D show variations of the exemplary embodiment shown in FIG. 3A, which differ from one another with regard to the setup of the tube body and the arrangement thereof in the plastic mass.

FIG. 3B shows a further development of the exemplary embodiment shown in FIG. 3A. In the exemplary embodiment shown in FIG. 3B, the radially outer narrow side 21a of the tube body 16 protrudes into the second plastic mass 11b. In addition, the radially inner narrow side 21b as well as the two broad sides 20a and 20b of the tube body 16 are covered or coated, respectively, with the second plastic mass 11b. This variation is recommended when the tube body 16 is made of an electrically conductive material.

Figure 3C:
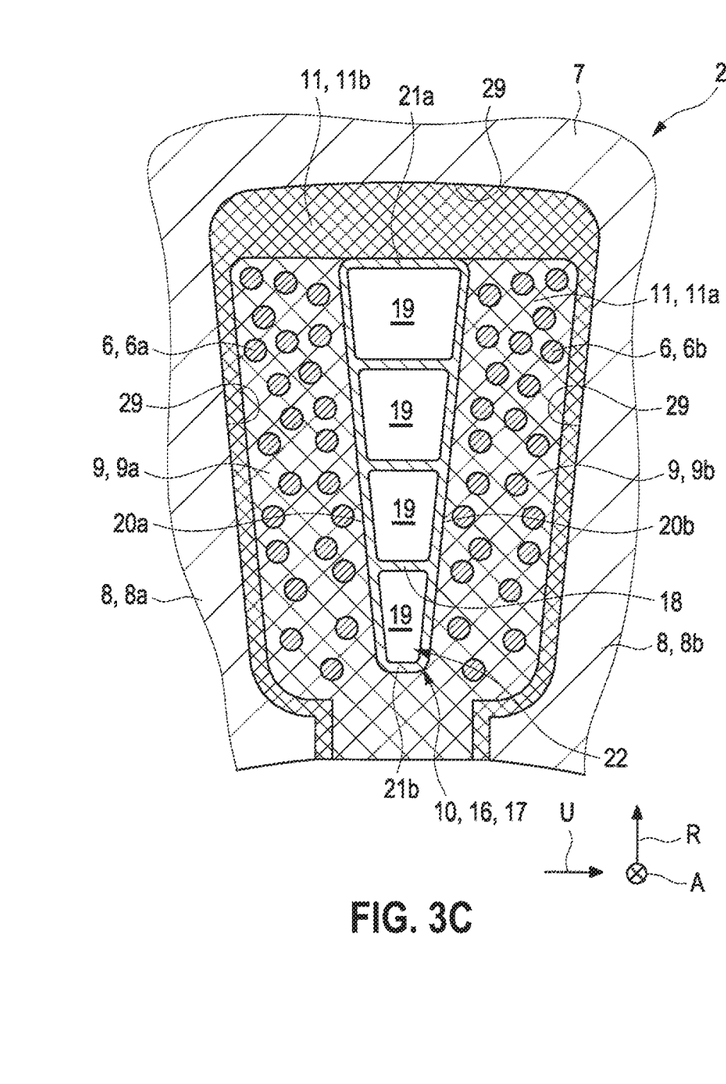

FIG. 3C shows a different further development of the exemplary embodiment shown in FIG. 3A. In the exemplary embodiment shown in FIG. 3C, the radially outer narrow side 21a has a larger lateral length than the radially inner narrow side 21b in the cross-section perpendicular to the axial direction A. This is typically associated with a tapering of the tube body 16 radially to the inside. The tube body 16 or the flat tube 17, respectively, thus has the geometry of a trapezoid. This variation uses the installation space, which is available in the intermediate space 9, particularly effectively for the arrangement of the cooling channel 10.

Figure 3D:
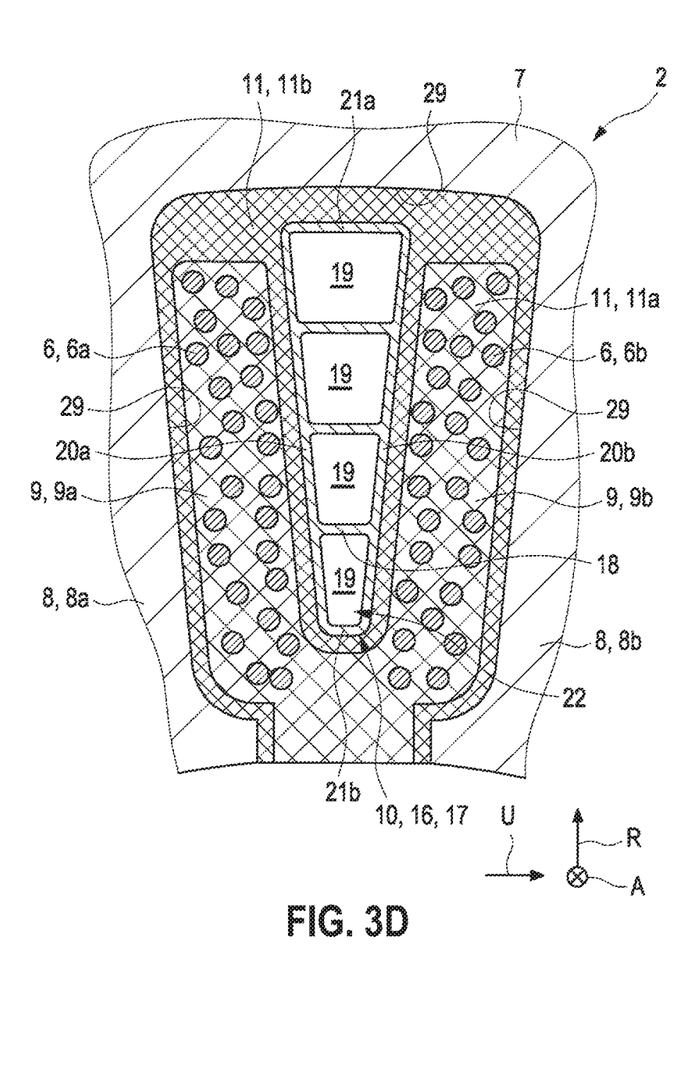

FIG. 3D shows a combination of the variations shown in FIGS. 3B and 3C. In the exemplary embodiment shown in FIG. 3D, the radial outer narrow side 21a also has a larger lateral length than the radially inner narrow side 21b in the cross-section perpendicular to the axial direction A. The tube body 16 or the flat tube 17, respectively, can thus in particular have the geometry of a trapezoid. In the exemplary embodiment shown in FIG. 3D, the radially outer narrow side 21a of the tube body 16 also protrudes into the second plastic mass 11b. The radially inner narrow side 21b as well as the two broad sides 20a and 20b of the tube body 16 are furthermore covered or coated, respectively, with the second plastic mass 11b. This variation is recommended when the tube body 16 is made of an electrically conductive material.

To produce an electric machine 1 shown in FIGS. 3A and 3C, the surface portions 29, which limit the intermediate space 9, of the two stator teeth 8a and 8b as well as of the stator body 7 are initially extrusion-coated with the second plastic material and the second plastic mass 11b is formed in this way. The tube body 16 forming the cooling channel is then introduced into the intermediate space 9. The stator windings 6 are likewise introduced into the intermediate spaces 9, are extrusion-coated with the first plastic mass 11a, and are fixed to the stator teeth 8a, 8b in this way.

To produce an electric machine 1 shown in FIGS. 3B and 3D, it is only required to introduce the tube body 16 or flat tubes 17, respectively, into the intermediate spaces 9 prior to the extrusion-coating with the second plastic material or the second plastic mass 11b, respectively. When extrusion-coating with the second plastic mass 1bb, the narrow sides 21a, 21b and the broad sides 20a and 20b of the tube body 16 or of the flat tube 17, respectively, are also covered or coated, respectively, therewith as desired.

Reference will be made to FIG. 1 again. As shown in FIG. 1, the plastic mass 11, in particular the first plastic mass 11a, can protrude axially from the intermediate spaces 9 on both sides. This also allows for the embedding of the cooling distribution chamber 4, and, alternatively or additionally, the coolant collection chamber 5 in the plastic mass 11, for thermal coupling to axial end portions 14a and 14b of the respective stator winding 6, which are arranged axially outside of the respective intermediate space 9. In other words, the plastic mass 11 in each case limits the coolant distribution chamber 4 as well as the coolant collection chamber 5 at least partially in the case of this embodiment variation.

In the area of the axial end portions 14a and 14b of the respective stator winding 6, which are usually specially loaded thermally, an effective heat transfer to the coolant K, which is present in the coolant distribution chamber 4 or coolant collection chamber 5, respectively, can also be established in this way. This measure allows for a particularly effective cooling of the two axial end portions 14a and 14b of the stator winding 6.

As shown in FIG. 1, the stator 2 together with the stator body 7 and the stator teeth 8 is further arranged axially between a first and a second bearing shield 25a and 25b. As can be seen in FIG. 1, a part of the coolant distribution chamber 4 is arranged in the first bearing shield 25a, and a part of the coolant collection chamber 5 is arranged in a second bearing shield 25b. The coolant distribution chamber 4 is thus limited by the first bearing shield 25a as well as by the plastic mass 11. The coolant collection chamber 5 is accordingly limited by the second bearing shield 25b as well as by the plastic mass 11.

The coolant distribution chamber 4 and the coolant collection chamber 5 are each partially realized by a cavity 41a and 41b formed in the plastic mass 11. The first cavity 41a is supplemented by a cavity 42a formed in the first bearing shied 25a to form the coolant distribution chamber 4. The second cavity 41b is accordingly supplemented by a cavity 42b formed in the second bearing shield 25b to form the coolant collection chamber 5.

A coolant supply 35, which fluidically connects the coolant distribution chamber 4 to a coolant inlet 33, which is provided on the first bearing shield 25a on the outside, in particular circumferentially as illustrated in FIG. 1, can further be formed in the first bearing shield 25a. A coolant discharge 36, which fluidically connects the coolant collection chamber 4 to a coolant outlet 34, which is provided on the bearing shield 25b on the outside, in particular circumferentially, as illustrated in FIG. 1, can accordingly be provided in the second bearing shield 25b. This provides for an arrangement of the coolant distribution chamber 4 or of the coolant collection chamber 5, respectively, in each case radially on the outside of the first or second end portion 14a and 14b, respectively, of the respective stator winding 6 and also in the extension of these end portions 14a and 14b along the axial direction A. The end portions 14a and 14b of the stator windings 6, which are specially loaded thermally during operation of the machine 1, can be cooled particularly effectively in this way.

As shown in FIG. 1, the plastic mass 11 made of the electrically insulating plastic can also be arranged on an outer circumferential side 30 of the stator body 7 and can thus form a plastic coating 11.1 on the outer circumferential side 30. The stator body 7 of the stator 2, which is typically formed of electrically conductive stator plates, can thus be electrically insulated against the surrounding area. The provision of a separate housing for receiving the stator body 7 can thus be forgone.

Figure 4:
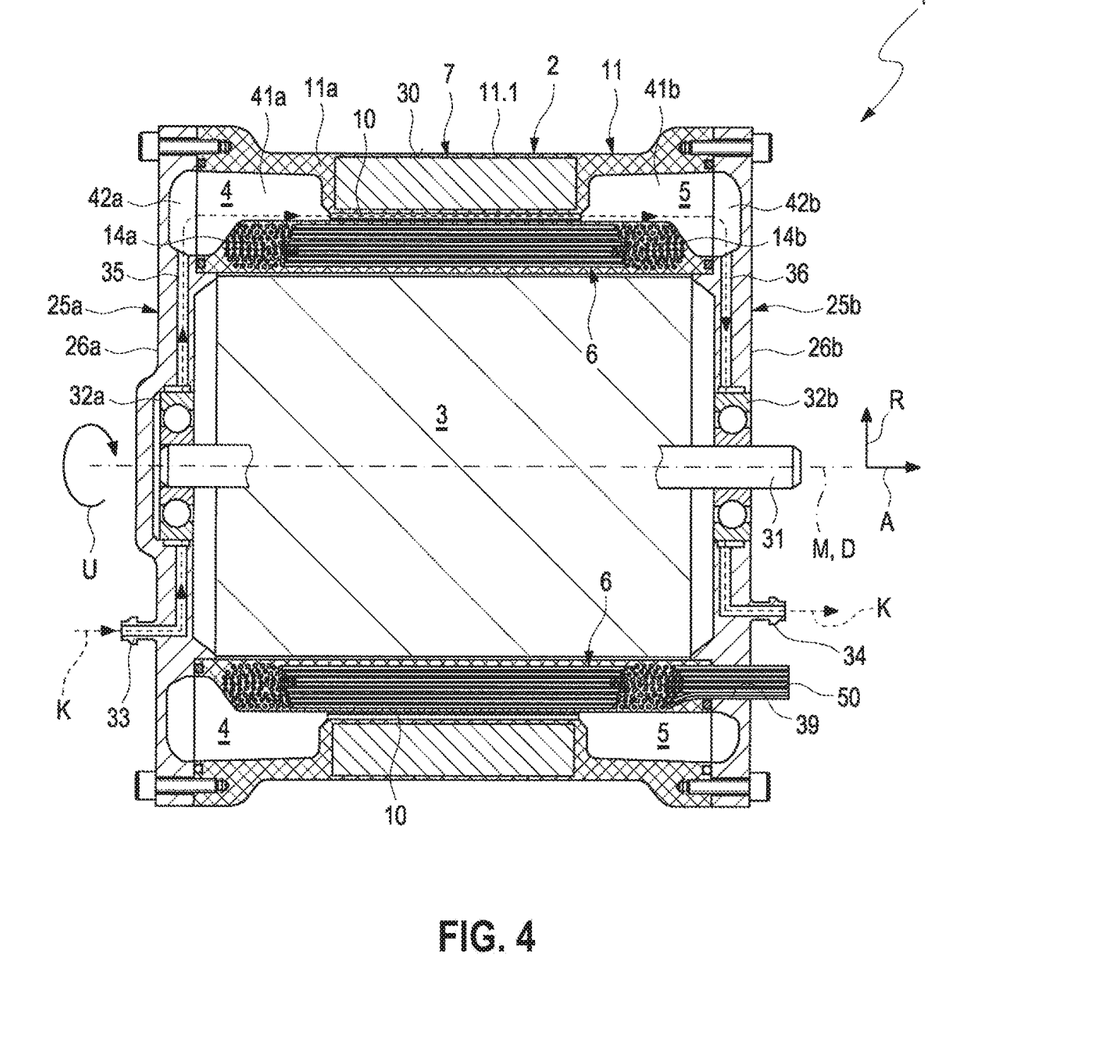
FIG. 4 shows a first variation of the electric machine shown in FIG. 1, in the case of which the coolant, which flows through the cooling channels, is also used to cool the shaft bearings of the rotor.

FIG. 4 shows a variation of the exemplary embodiment shown in FIG. 1 in the longitudinal section along the axis of rotation D of the rotor 3. To also cool the rotor shaft 31 as well as the two shaft bearings 32a and 32b during operation of the machine 1, the coolant supply 35 can be thermally coupled to the first shaft bearing 32a, which is arranged in the first bearing shield 25a. The coolant discharge 36 can likewise be thermally coupled to the second shaft bearing 32b, which is arranged in the second bearing shield 25b. A separate cooling device for cooling the shaft bearings 32a and 32b can be forgone in this way, which results in cost advantages. In the exemplary embodiment shown in FIG. 4, the coolant inlet 33 and the coolant outlet 34 are provided on the outer front side 26a or 26b, respectively, of the first or second bearing shield 25a and 25b, respectively. In the case of the variation according to FIGS. 4 and 1, the stator windings 6 are arranged radially within the cooling channels 10 with respect to the radial direction R. The stator windings 6 are guided out of the stator 2 to the outside with an electrical connection 50 through a lead-through 39 provided in the second bearing shield 25b, such that they can be electrically energized from the outside. The lead-through 39 is arranged between the coolant distribution chamber 4 or the coolant collection chamber 5, respectively, and the axis of rotation D with respect to the radial direction R.

Figure 5:
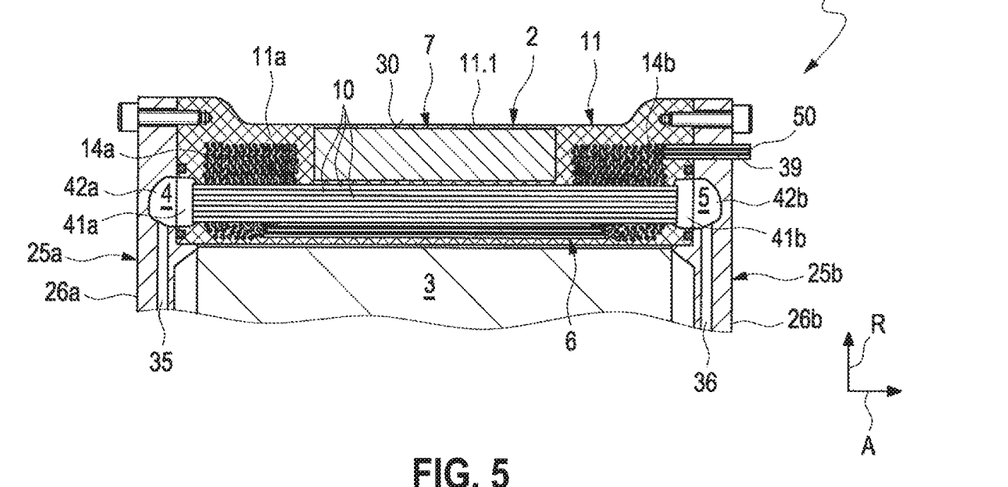
FIG. 5 shows a second variation of the electric machine shown in FIG. 1, which requires particularly little installation space.

In the exemplary embodiment shown in FIG. 5, which is simplified as compared to FIG. 4, in a partial illustration, the coolant distribution chamber 4 and the coolant collection chamber 5 are arranged only in the axial extension of the cooling channels 10. This variation requires particularly little installation space for the coolant distribution chamber 4 and for the coolant collection chamber 5. In the case of the variation according to FIG. 5, the stator windings 6 are arranged radially within the cooling channels 10 with respect to the radial direction R. In the alternative or in addition, however, an arrangement radially outside of the cooling channels 10 is also conceivable. The stator windings 6 are guided out of the stator 2 to the outside with an electrical connection 50 through a lead-through 39 provided in the second bearing shield 25b, such that they can be electrically energized from the outside. The lead-through 39 is arranged in the second bearing shield 25b radially outside of the coolant distribution chamber 4 or of the coolant collection chamber 5, respectively, with respect to the radial direction R.

Figure 6:
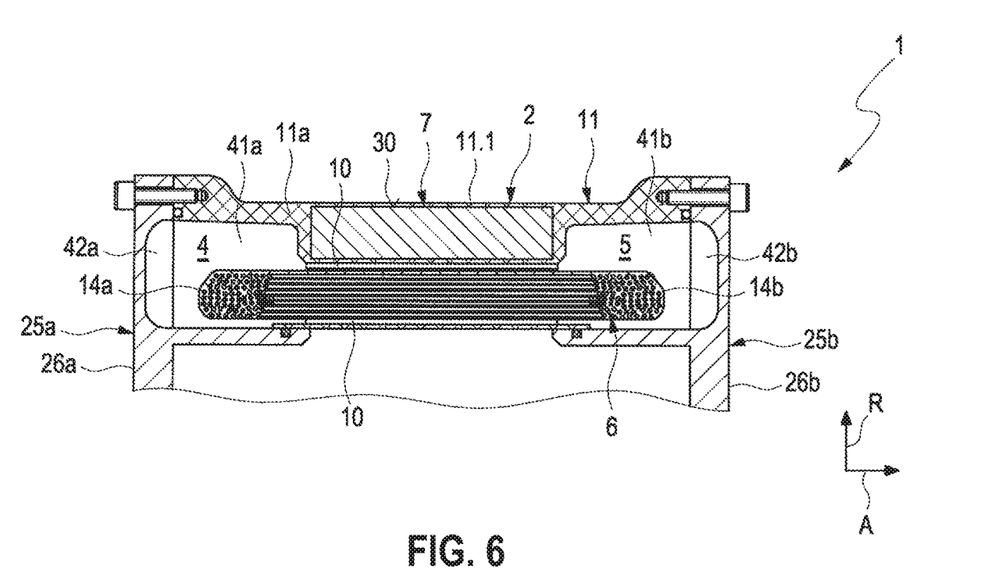
FIG. 6 shows a third variation of the machine shown in FIG. 1, which provides for a particularly effective cooling of the stator windings.

In the exemplary embodiment shown in FIG. 6, a further development of FIG. 4 is shown. In the longitudinal section along the axis of rotation D illustrated in FIG. 6, the coolant distribution chamber 4 surrounds the first axial end portion 14a of the respective stator winding 6 in a U-shaped or C-shaped manner, thus along the immediate axial extension thereof, as well as radially on the inside and radially on the outside in the case of this further development. The coolant collection chamber 5 accordingly surrounds the second axial end portion 14b of the respective stator winding 6 in a U-shaped or C-shaped manner, thus along the axial extension thereof as well as radially on the inside and radially on the outside in the longitudinal section along the axis of rotation D. In the case of this variation, cooling channels 10 are provided radially within as well as radially outside of the stator winding 6. The respective stator windings 6, including the axial end portions 14a and 14b thereof, are thus in thermal contact with the coolant K via the cooling channels 10 as well as via the coolant distribution chamber 4 and the coolant collection chamber 5. This allows for an effective cooling of the stator windings 6, including the axial end portions 14a and 14b thereof, which are subject to thermally special loads during operation of the machine 1.

The entire plastic mass 11, thus in particular the plastic mass 11, which is arranged in the intermediate spaces 9 between the stator teeth 9 and which limits the coolant distribution chamber 4 and the coolant collection chamber 5, can advantageously be formed in one piece.

It is understood that the foregoing description is that of the exemplary embodiments of the disclosure and that various changes and modifications may be made thereto without departing from the spirit and scope of the disclosure as defined in the appended claims.

What is claimed is:

1. An electric machine for a vehicle, the electrical machine comprising:
   a rotor, which can be rotated about an axis of rotation, which defines an axial direction of the electric machine;
   a stator, which has several stator windings;
   a coolant distribution chamber; and
   a coolant collection chamber, which is arranged axially at a distance thereto,
   wherein the coolant distribution chamber communicates fluidically with the coolant collection chamber with at least one cooling channel, through which a coolant can flow,
   wherein the at least one cooling channel and the at least one stator winding are embedded in a plastic mass made of a plastic for thermal coupling to the coolant,
   wherein the stator has stator teeth, which extend along the axial direction and which are arranged spaced apart from one another along a circumferential direction and which carry the stator windings,
   wherein the at least one plastic mass is arranged together with the at least one cooling channel and with the at least one stator winding in an intermediate space, which is formed between two stator teeth, which are adjacent in the circumferential direction,
   wherein, within the intermediate space, the at least one cooling channel is formed at least section by section as a tube body, which has two broad sides in a cross-section perpendicular to the axial direction,
   wherein the two broad sides are located opposite one another in the circumferential direction,
   wherein the tube body divides the intermediate space, which is limited by a first and a second stator tooth in the circumferential direction, into a first and a second partial space along the circumferential direction,
   wherein a first stator winding, which is wound onto the first stator tooth, is arranged in the first partial space,
   wherein a second stator winding, which is wound onto the second stator tooth, is arranged in the second partial space,
   wherein the tube body surrounds a tube body interior,
   wherein at least one separating element, which divides the tube body interior into at least two partial cooling channels, which are fluidically separated from one another, is integrally molded on the tube body,
   wherein a first entire side of the two broad sides is arranged next to the first stator winding, and
   wherein a second entire side of the two broad sides is arranged next to the second stator winding.

2. The electric machine according to claim 1, wherein a first plastic mass made of a first plastic material and a second plastic mass, which differs therefrom, made of a second plastic material is arranged in the intermediate space.

3. The electric machine according to claim 2, wherein the two plastic masses have different thermal conductivities.

4. The electric machine according to claim 2, wherein the two plastic masses have the same thermal conductivity.

5. The electric machine according to claim 2, wherein the at least one stator winding in the intermediate space is embedded in the first plastic mass made of the first plastic material, the first plastic mass together with the stator winding embedded therein and the at least one cooling channel are embedded in the second plastic mass made of the second plastic material and/or are limited by the latter, the thermal conductivity of which is smaller than the thermal conductivity of the first plastic material.

6. The electric machine according to claim 2, wherein the first plastic material of the first plastic mass and/or the second plastic material of the second plastic mass comprises a thermosetting plastic or is a thermosetting plastic.

7. The electric machine according to claim 2, wherein the first plastic material of the first plastic mass and/or the second plastic material of the second plastic mass comprises a thermoplastic or is a thermoplastic.

8. The electric machine according to claim 2, wherein the first plastic material of the first plastic mass is a thermoplastic or a thermosetting plastic, and the second plastic material of the second plastic mass is a thermosetting plastic.

9. The electric machine according to claim 1, wherein the tube body has two narrow sides, which are located opposite one another in a radial direction.

10. The electric machine according to claim 9, wherein the radially outer narrow side of the tube body touches the second plastic mass or protrudes into the latter in the cross section perpendicular to the axial direction.

11. The electric machine according to claim 10, wherein the radially outer one of the two narrow sides has a larger lateral length than the radially inner narrow side in the cross section perpendicular to the axial direction.

12. The electric machine according to claim 9, wherein the radially inner narrow side as well as the two broad sides of the tube body are covered or coated with the second plastic mass in the cross-section perpendicular to the axial direction.

13. The electric machine according to claim 9, wherein the lateral length of at least one of the two narrow sides is maximally one fourth of a lateral length of at least one of the broad sides in the cross-section perpendicular to the axial direction, such that the tube body forms a flat tube.

14. The electric machine according to claim 1, wherein:
   the tube body has the geometry of a rectangle or of a trapezoid in the cross-section perpendicular to the axial direction, and/or
   the tube body tapers radially to the inside in the cross-section perpendicular to the axial direction.

15. The electric machine according to claim 1, wherein the coolant distribution chamber and/or the coolant collection chamber are at least partially arranged in the at least one plastic mass and are limited by the latter for thermal coupling to the at least one stator winding.

16. The electric machine according to claim 1, wherein the coolant distribution chamber and/or the coolant collection chamber is formed by a cavity, which is present at least partially, or completely, in the plastic mass.

17. The electric machine according to claim 1, wherein the at least one plastic mass, or the first and/or second plastic mass, at least partially limits the coolant distribution chamber and/or the coolant collection chamber.

18. The electric machine according to claim 1, wherein the coolant distribution chamber and/or the coolant collection chamber has a ring-shaped geometric shape in a cross section perpendicular to the axis of rotation of the rotor.

19. The electric machine according to claim 1, wherein the coolant distribution chamber and/or the coolant collection chamber is arranged radially on the outside and/or radially on the inside of the first or second end portion, respectively, of the at least one stator winding.

20. The electric machine according to claim 1, wherein the coolant distribution chamber and/or the coolant collection chamber each form an axial extension of the stator winding and/or are each arranged in an axial extension of the stator winding.

21. The electric machine according to claim 1, wherein the coolant distribution chamber and/or the coolant collection chamber connect axially to the at least one stator winding, or on the first or second axial end portion thereof, respectively.

22. The electric machine according to claim 1, wherein the coolant distribution chamber and/or the coolant collection chamber connect radially on the outside and/or radially on the inside as well as axially on the end side to the at least one stator winding, or to the first or second axial end portion thereof, respectively.

23. The electric machine according to claim 1, wherein the coolant distribution chamber and/or the coolant collection chamber surrounds the first or second axial end portion, respectively, of the at least one stator winding in a U-shaped or C-shaped manner in a longitudinal section along the axis of rotation.

24. The electric machine according to claim 1, wherein:
the stator is arranged along the axial direction between a first and a second bearing shield, which are located axially opposite one another,
a part of the coolant distribution chamber is arranged in the first bearing shield or is at least limited thereby, and/or
a part of the coolant collection chamber is arranged in the second bearing shield or is at least limited thereby.

25. The electric machine according to claim 24, wherein:
a coolant supply, which fluidically connects the coolant distribution chamber to a coolant inlet, which is provided on the first bearing shield on the outside, or on the front side or on the circumferential side, is formed in the first bearing shield,
the coolant supply is thermally connected to a first shaft bearing, which is provided in the first bearing shield, for rotatably supporting the stator, and/or
a coolant discharge, which fluidically connects the coolant collection chamber to a coolant outlet, which is provided on the second bearing shield on the outside, or on the front side or on the circumferential side, is formed in the second bearing shield, and
the coolant discharge is thermally connected to a second shaft bearing, which is provided in the second bearing shield, for rotatably supporting the stator.

26. The electric machine according to claim 1, wherein:
the at least one plastic mass comprises a thermosetting plastic or is a thermosetting plastic, and/or
the at least one plastic mass comprises a thermoplastic or is a thermoplastic.

27. The vehicle comprising at least one electric machine according to claim 1.

* * * * *